United States Patent Office 3,741,734
Patented June 26, 1973

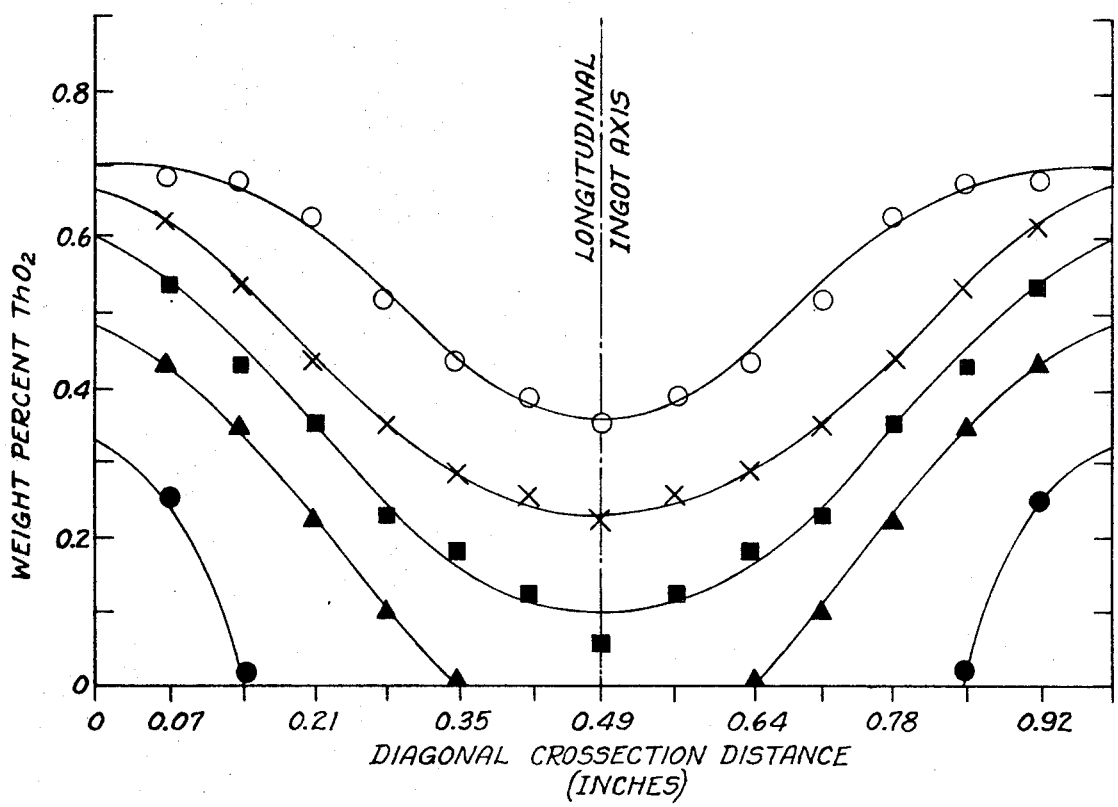

3,741,734
METAL PRODUCTS AND PROCESS OF PREPARATION
Thomas E. Dunham, Cleveland Heights, Ohio, assignor to General Electric Company
Filed Oct. 4, 1971, Ser. No. 186,143
Int. Cl. B22f 7/00; B05c 3/02
U.S. Cl. 29—182.5                             23 Claims

ABSTRACT OF THE DISCLOSURE

A liquid diffusion technique is described which enables fabrication of various metallurgical products having a compositional gradient which diminishes continuously with increasing distance from the exterior surfaces of the particular product. More particularly, the products obtained by said technique have a predominant matrix of a base metallic composition in which is dispersed an additive metal or metal composition with the additive concentration being uniformly less with direction from the surface of the product to the product interior. It is possible by said technique to form dispersion alloy products wherein the alloying agent is present in a dispersed phase and the alloy concentration is varied in accordance with liquid diffusion principles. The present technique is particularly useful in power metallurgy applications to provide products with highly uniform compositional gradients when the solubilty of the additive in the particular matrix composition is not significant.

BACKGROUND OF THE INVENTION

The present invention relates to a particular technique of providing a composite material starting with a porous body in which an additive is supplied as a liquid suspension which impregnates the pore openings of the porous member. Specifically, the porous body is first impregnated with a liquid transport medium which fills the pores and thereafter is soaked in the liquid additive suspension to enable transfer of additive to the already liquid filled pore openings by a diffusion mechanism.

It is already known in the metallurgical arts to impregnate a porous compact with a liquid suspension of one or more additives. In one known method, the porous member is immersed in the liquid suspension which permits the additive to enter the pore openings by capillary infiltration. The infiltration can be assisted by first evacuating the pore openings to preclude entrapment of gas in the porous member or by admitting the liquid additive under pressure to more readily fill all the voids. Capillary infiltration has a tendency to provide a uniform concentration of the additive throughout the porous compact since the infiltration process is relatively fast.

In a modification of the above method, the impregnation is carried out with a liquid solution of the additive and the process is interrupted with an objective of establishing a concentration gradient of the additive directed from the surface of the porous member toward its core by the capillary action taking place. The additive present in the pores is thereafter fixed by chemical precipitation and excess solution is then removed. Experience with this capillary infiltration technique has found that the concentration gradient of the additive established by the capillary forces is either minimal or non-uniform, hence lacks sufficient control for practical purposes. Since the capillary forces continue to be exerted after removal of the porous member from the liquid additive suspension and the liquid is distributed throughout the pore structure in a relatively short time duration, it becomes extremely difficult as a practical matter to interrupt the process and form any desired concentration gradient of additive in the porous body.

Still other problems are encountered with a porous body in which the additive has been dispersed non-uniformly by methods other than a capillary infiltration technique. This can be especially true with respect to those refractory metal compositions which are dispersion alloys and are conventionally prepared starting with a solid mixture of the refractory metal containing one or more additives. As distinct from the more conventional solution alloys wherein the aloying components form a solid solution, a dispersion alloy is obtained between metals or metal compositions which do not form a solid solution to any significant degree such as tungsten and thoria. A known dispersion alloy product between tungsten and thoria which has been prepared by dry-blending the starting materials has a continuous phase of tungsten crystals having dispersed therein discrete crystals of thoria. The conventional dispersion alloy products are prepared by forming a porous compact from the blended powder mixture of starting materials which is thereafter heated while being mechanically worked to provide the physical properties ultimately desired. Tungsten and molybdenum dispersion alloy products prepared in the above-indicated manner are often found to include a non-uniform dispersion of the particular additive in the matrix of base refractory metal. A different problem is encountered with oversize particles of the solid additive when swaging the refractory metal product. More particularly, special care must be exercised during such mechanical working to avoid cracks and other defects from developing at the grain boundaries of the refractory metal crystals and which can be caused by overly large particles of the dispersed solid additive. A still further problem develops during recrystallization of the refractory metal which takes place during swaging and which can be aggravated at least in part by non-uniform dispersion of the additive. Since the solid additive can obstruct grain growth of the individual refractory metal crystals, there could be uneven crystal size of the refractory metal with the larger crystals being formed at locations where the solid additive is absent. In extreme cases cracks can develop between the different size crystals when the dispersion alloy product is mechanically worked.

It would thereby be useful to provide imporved means of distributing an additive in a porous member whereby a uniform and reliable concentration gradient of the additive is established. It would also be desirable to interrupt the additive incorporation and provide a product with a core of the original matrix material.

SUMMARY OF THE INVENTION

It is an object of the present invention to provide a process of incorporating a solid additive into a porous body of metallic composition so that a predetermined concentration gradient of the additive is established which is readily and reliably obtained. A further object is to provide various metallurgical products having a uniform concentration gradient of one or more solid additives disposed in a matrix of the starting metallic composition. Still a further object is to provide various methods of heat treating the porous member after one or more additives have been incorporated in accordance with the present invention to provide novel dispersion alloy products.

Briefly stated, the liquid diffusion process of the present invention impregnates a porous compact with an inert liquid solvent for the additive and then immerses the liquid filled compact in a solution of said additive until a sufficient time period has elapsed to permit the desired degree of liquid diffusion to take place whereby the dissolved additive enters into at least a portion of the pores already occupied by solvent. The liquid diffusion process can be interrupted when a predetermined amount of additive has entered into the pores to provide a continuously diminishing concentration of the additive in the direction of the central core of the porous compact. More particularly, the maximum concentration of additive exists at the exterior surface portion of the porous member with said concentration continuously diminishing as the distance increases to the center core of the porous member in accordance with operating principles of liquid diffusion. Liquid solvent is then removed from the porous compact to retain a continuous concentration gradient of solid additive in the pores of the composite member formed. Various forms of heat treating said member after incorporation of the additive provides a variety of novel dispersion alloy products as hereinafter described.

In one preferred embodiment, a refractory metal dispersion alloy is produced by conducting the above generally described liquid diffusion techniques upon a pressed compact of tungsten particles having an interconnected pore structure wherein the porous tungsten member is first soaked in water until all pores are essentially filled. The water filled compact is then immersed in an alcohol solution of thorium nitrate for various time periods dependent upon the thickness of alloy shell desired in the final product. Removal of both solvents is accomplished by drying the treated member which can then be processed by the conventional sintering operation to provide a thoriated tungsten crystalline structure density of at least 70% of the theoretical value.

The final dispersion alloy product has an exterior shell of extremely fine grain thoriated tungsten crystalline structure which is further characterized by relative freedom from sharp compositional variation at the interface between said alloy shell and the interior unalloyed core of the sintered member. The individual thoria particles which are uniformly distributed in the tungsten crystalline matrix in accordance with the previously defined concentration gradient are significantly smaller in size than can be obtained with the conventional method of preparation. The tungsten crystals obtained after recrystallization of a small diameter wire product were found to be equiaxial in form which differs from the larger elongated grain structure obtained when a comparable dispersion alloy product had been prepared from the dry mixture of the starting materials. It would be further possible to combine the liquid diffusion method of incorporating more additive in the outer shell of a porous tungsten compact already having some thoria material added by the above-indicated conventional method of preparation and thereby provide distinctly different tungsten grain structure during the recrystallization step attributable in part to size and distribution of thoria in the final product.

In the conventional manufacture of thoriated tungsten material, a pressed compact is prepared from a dry-blended mixture of tungsten powder and thoria particles which can be accomplished by hydraulic compression at pressures from 10 to 40 tons per square inch. The compact is next presintered in a hydrogen atmosphere at approximately 1200° C. to provide sufficient mechanical strength for handling. The presintered thoriated tungsten compact is still too fragile to be worked mechanically and is sintered at temperatures above 1500° C. in a hydrogen atmosphere to provide the needed working strength. The sintering treatment can be provided by suspending the presintered compact vertically between electrodes and applying sufficient electrical current through the member to raise its temperature nearly to the melting point. The electric current utilized in sintering is approximately 92% to 95% of that required to melt the presintered compact and during this treatment the compact shrinks approximately 15% to 20% to attain an approximate density from 17 to 18 grams per cubic centimeter. The current is applied in graduated steps to provide for an escape of any volatile impurities or binder agents that were used while the compact is sufficiently porous to preclude excessive internal gas pressure from being generated. While the sintered compact has considerable mechanical strength, the material is also quite brittle and cannot be deformed appreciably at room temperature without fracture. Ductility improves significantly at higher temperatures so that at about 1300° C. the material can be rolled or hammered to provide a final product closely approximating the theoretical density of tungsten. The swaging operation establishes the final grain structure in the sintered compact and further provides a shape which can be further processed into useful articles of the material such as sheet or wire. The swaging is ordinarily accomplished in a hammer mill where the metal is worked below its recrystallization temperature but is reheated between passes to approximately 1450° C. where pronounced recrystallization occurs which helps further working.

Dispersion alloy products of the present invention can be prepared in the same general manner above described for manufacture of conventional thoriated tungsten material after the thoria additive has been incorporated by liquid diffusion into a porous tungsten compact. It is further contemplated to modify certain of the processing steps which follow impregnation with an additive by the liquid diffusion technique in order to form the final dispersion alloy product. More particularly, it is contemplated to employ as the additive a thermally reactive material such as a metal salt that can be thermally decomposed upon heating the impregnated compact after removal of the solvent and thus provide an additive which forms the dispersion alloy upon subsequent sintering of the compact. Likewise, it is also contemplated to employ as the additive for incorporation into the porous compact a material which can be chemically reacted at ordinary or elevated temperatures with one or more other chemical reactants such as gases or vapors to provide an additive which forms a dispersion alloy product with the base metallic composition.

BRIEF DESCRIPTION OF THE DRAWING

The accompanying graph depicts the concentration gradient for a thorium oxide additive dispersed in accordance with the present invention.

DESCRIPTION OF THE PREFERRED EMBODIMENTS

Basically, the liquid diffusion process of the present invention comprises impregnating a porous compact having an interconnected pore structure with an inert liquid solvent until the pore structure of said compact is essentially filled with solvent and thereafter immersing the solvent filled compact in a liquid solution containing a dissolved solid additive for a sufficient time period to permit liquid diffusion of the dissolved additive into at least a portion of the solvent contained in the pores of the compact. Upon impregnation with the solid additive, the compact is removed from the solution when a predetermined extent of liquid diffusion has taken place and solvent is removed from the pores of the compact to retain a concentration gradient of the solid additive in the pores of the composite formed. By "inert liquid solvent" is meant a solvent for the particular additive which can be removed by drying or heating the liquid filled compact without leaving a residue in the pore structure or undergoing any significant chemical reaction with the base metallic composition. In modifications of the above-described liquid diffusion process, there can be added a mixture of additives dissolved in the same liquid solvent or a different solvent can be used to fill the pore structure than is employed in the solution of one or more additives. When a first liquid solvent is used to saturate the compact while a second liquid solvent is used to prepare the additive solution, it follows that the concentration gradient of solid additive in the porous compact after removal of solvent will be defined by liquid diffusion principles applicable to diffusion of the additive from said first liquid solvent into the second liquid solvent.

While the mechanism of liquid diffusion which determines additive concentration is not fully defined at the present time, certain operative factors have been found to apply when incorporating the additive according to the present invention. Once the porous compact has been saturated with solvent, it is immersed in the additive solution of desired concentration and held there for a time commensurate with the desired impregnation thickness. In most cases, the actual diffusion time is established experimentally since the compact geometrics vary between materials of composition and methods of preparation. The character of the solvent selected for the additive solution is also important. If the solvent is quite viscous, it may not penetrate small interstices of the porous compact. If the wettability of the solvent with respect to the base metallic composition surface is low, it may also not be possible to saturate the ingot completely. The concentration of additive in the additive solution and the temperature at which the liquid diffusion takes place can materially vary the liquid diffusion process. An increase in the concentration of additive in the additive solution uniformly shifts the concentration profile of the additive in the impregnated compact as well as the final dispersion alloy product to a higher value. Two practical consequences of this profile shift are an increased shell thickness of the additive for a given diffusion time and increased amount of additive in the material. Increasing the temperature at which the liquid diffusion process is conducted speeds up the impregnation but does not increase concentration of the additive in the impregnated material beyond that which could be obtained by lengthening the diffusion time period. Finally, it has been noted that increasing time of the diffusion process causes an upward shift of the concentration profile of additive in the impregnated compact, but unlike the uniform shift accompanying increase in additive solution concentration, there is no increase in additive concentration at exterior surfaces of the impregnated compact.

Specific examples describing preparation of dispersion alloy products prepared in accordance with the present invention will now be given.

Example 1

A pressed compact measuring one inch diagonally in cross section was prepared by conventional technique from tungsten powder having an average particle size of 2.5 microns with said compact having an approximate weight of 3 kilograms and a density of approximately 11.0 grams per cubic centimeter. Test specimens (ingots A–E) having a 5-inch length were obtained from the pressed compact and soaked in water until the void spaces were saturated with the solvent. A solution of the solid additive was prepared containing approximately 539 grams $Th(NO_3)_4 \cdot 4H_2O$ per liter in a second liquid solvent of water. The test specimens still having the pore structure saturated with water were then immersed in the thorium nitrate solution for various time periods reported in the graph which accompanies this patent applications along with the depth of penetration for the dissolved additive. The pregnated specimens were then removed from the thorium nitrate solution and dried for 20 hours in a conventional drying oven at 120° F. Drying removed solvent from the pores of the soaked specimens but retained a concentration gradient of the solid additive in the pores to the depths specified in the accompanying graph. The dried specimens were next heated in air to approximately 400° F. to convert the thorium nitrate in the pores to thorium oxide (thoria) during a 2½-hour reaction time period. The test specimens were next subjected to a conventional presintering at 1200° C. in hydrogen which was followed by sintering at 2400° C. for 2 hours in hydrogen to produce a fully defined thoriated tungsten composition having a density range from 93% to 97% of the theoretical value.

The test specimens were examined by a known autoradiograph technique after impregnation and sintering and found to have a visible concentration gradient of the additive with a maximum concentration being located at the exterior surface portions of the porous compact and said concentration continuously diminishing with increasing distance to the center portion of the compact along its longitudinal axis. A comparison was also made of the final dispersion alloy products prepared as above described from the standpoint of crystalline structure. Differences in crystalline structure were noted when compared with dispersion alloy products produced from a dry mixture of the starting material. More particularly, the thoria particles in the thoriated tungsten crystalline structure produced in accordance with the present invention were both uniformly smaller in size range and more uniformly distributed in the tungsten matrix without significant agglomeration compared with that obtained by the conventional method of preparation.

The accompanying graph illustrates the concentration gradient of thoria obtained in the present example. The diagonal distance measured along various points on a line extending from one corner to the opposite corner for a representative cross section of the impregnated ingot is plotted as the abscissa upon said graph. The ordinate of the graph constitutes concentration of thoria in weight percent at the points denoted on the abscissa of the graph and as determined in a manner hereinafter described. The weight percent thoria at the corner and center points of the ingot cross section was first determined by ordinary chemical analysis from samples taken at these locations. Autoradiographs of the ingot cross sections were next obtained to permit determination of the weight percent thoria at the interim points plotted on the abscissa of the graph. The autoradiographs were analyzed along the line from corner to corner of the ingot cross section using a Jarrell Ash microphotometer densitometer model 2310 to obtain the transmittance values. With the known concentration of thoria at the corner and center locations of the ingot cross section and the known transmittance values at these locations, a straight line plot was next obtained having percent transmittance as the ordinate and weight percent thoria as the abscissa. For a given transmittance on the autoradiograph at a given interim point along the diagonal cross-section line of the ingot, the straight line plot was used to obtain weight percent thoria for each given location and represented on the accompanying graph.

Example 2

A dispersion alloy product was prepared from a base metallic composition consisting of 97% by weight tungsten and 3% by weight rhenium using the same dispersion technique described in Example 1. More particularly, a pressed compact was first obtained from a dry blend of the metal element forming the base metallic compositions and specimens from said compact then impregnated by liquid diffusion with a thorium nitrate solution for various time periods. Examination of the dispersion alloy products produced by sintering the impregnated test specimens again confirmed the high degree of controllability over the thickness of the dispersed addiitve layer as well as the gradual compositional change from the dispersion alloy shell to the solution alloy interior for certain of the final products. The crystalline structure of said composite materials exhibited a fine grain matrix of the tungsten-rhenium solution alloy with an exterior shell of fine grain thoria particles being distributed at crystalline boundaries of the matrix material. The concentration gradient of thoria in the dispersion alloy product followed the same pattern depicted in graph for Example 1.

It can be appreciated from the foregoing description of exemplary embodiments employed to form the novel dispersion alloy products of the present invention that various modifications in the liquid diffusion technique and the products obtained therefrom can provide comparable results. More particularly, it is contemplated to disperse additives other than oxides in a porous matrix of the base metallic composition including additives which require further chemical reaction to provide a composition which forms a dispersion alloy product with the base metallic composition. Likewise, it is also contemplated to disperse additive mixtures by the same liquid diffusion technique and provide a dispersion alloy product which can include a dispersed phase of mixed oxides as well as different concentration gradients for each solid additive. It is intended to limit the present invention, therefore, only to the scope of the following claims.

What I claim as new and desire to secure by Letters Patents of the United States is:

1. A liquid diffusion process which comprises:
   (a) impregnating a porous compact having an interconnected pore structure with an inert liquid solvent until the pore structure of said compact is essentially filled with solvent,
   (b) immersing the solvent filled compact in a liquid solution containing a dissolved solid additive for a sufficient time period to permit liquid diffusion of the dissolved solid additive into at least a portion of the solvent contained in the pores of said compact,
   (c) removing the compact from said solution when a predetermined extent of liquid diffusion has taken place, and
   (d) removing solvent from the pores of the compact to retain a concentration gradient of the solid additive in the pores of the composite formed.

2. A process as in claim 1 wherein the porous compact has a predominant matrix of metal particles and the solid additive forms a dispersion alloy product therewith.

3. A process as in claim 1 wherein the porous compact is removed from the solution containing a dissolved additive before the center core portion of the porous compact has been impregnated with the solid additive.

4. A process as in claim 1 which includes heating the composite to the sintering temperature.

5. A process as in claim 1 which includes heating the compact above the melting temperature of the solid additive.

6. A process as in claim 1 which includes using a thermally reactive material as a solid additive and heating the composite above the reaction temperature of the additive.

7. A process as in claim 1 which includes using a solution containing a mixture of dissolved solid additives.

8. A metallurgical process which comprises:
   (a) impregnating a porous compact having a predominant matrix of a base metallic composition and an interconnected pore structure with an inert liquid solvent until the pore structure of said compact is essentially filled with solvent,
   (b) immersing the solvent filled compact in a liquid solution containing a dissolved solid additive which forms a dispersion alloy product with the base metallic composition for a sufficient time period to permit liquid diffusion of the solid additive into at least a portion of the solvent containing the pores of said compact,
   (c) removing the compact from said solution when a predetermined extent of liquid diffusion has taken place,
   (d) removing solvent from the pores of the compact to retain a concentration gradient of the solid additive in the pores of the composite formed, and
   (e) sintering the compact to form the dispersion alloy product.

9. A metallurgical process which comprises:
   (a) impregnating a porous compact having a predominant matrix of a base metallic composition and an interconnected pore structure with a first inert liquid solvent until the pore structure of said compact is essentially filled with solvent,
   (b) immersing the first solvent filled compact in a second inert liquid solvent containing a dissolved solid additive which is a thermally reactive material that can be reacted to form a dispersion alloy product with the base metallic composition for a sufficient time period to permit liquid diffusion of the dissolved solid additive into at least a portion of the first solvent contained in the pores of said compact,
   (c) removing the compact from said solution when a predetermined extent of liquid diffusion has taken place,
   (d) removing solvent from the pores of the compact to retain a concentration gradient of the solid additive in the pores of the composite formed,
   (e) heating the compact above the reaction temperature of the thermally reactive material, and
   (f) sintering the compact to form the dispersion alloy product.

10. A metallurgical process which comprises:
    (a) impregnating a porous compact having a predominant matrix of a refractory metal and an interconnected pore structure with a first inert liquid solvent until the pore structure of said compact is essentially filled with solvent,
    (b) immersing the first solvent filled compact in a second inert liquid solvent containing a dissolved salt of a different metal which can be thermally decomposed to an oxide composition that forms a dispersion alloy product with the refractory metal for a sufficient time period to permit liquid diffusion of the dissolved metal salt to at least a portion of the first solvent contained in the pores of the said compact,
    (c) removing the compact from said solution when a predetermined extent of liquid diffusion has taken place,
    (d) removing solvent from the pores of the compact a retain a concentration gradient of the solid additive in the pores of the composite formed,
    (e) heating the compact to thermally decompose the metal salt to an oxide composition, and
    (f) sintering the compact to form the dispersion alloy product.

11. A metallurgical process which comprises:
    (a) impregnating a porous compact having a predominant matrix of a refractory metal and an interconnected pore structure with a first inert liquid solvent until the pore structure of the compact is essentially filled with solvent,
    (b) immersing the first solvent filled compact in a second inert liquid solvent containing a mixture of dissolved thermally reactive salts that can be reacted to form a dispersion alloy product with the refractory metal for a sufficient time period to permit liquid diffusion of the dissolved metal salts into at least a portion of the first solvent contained in the pores of said compact,
    (c) removing the compact from said solution when a predetermined extent of liquid diffusion has taken place,
    (d) removing solvent from the pores of the compact to retain a concentration gradient of the solid additive in the pores of the composite formed,
    (e) heating the compact above the reaction temperature of the metal salts, and
    (f) sintering the compact to form the dispersion alloy product.

12. A porous metal body having a predominant matrix of a base metallic composition with an interconnected pore structure which contains a solid additive in at least a portion of the pores such that a concentration gradient of the solid additive exists with maximum concentration being located at every exterior surface portion of said porous body and with said concentration continuously and uniformly diminishing with increasing distance to the interior portion of the porous body so that no sharp compositional variation of the additive results along said concentration gradient.

13. A porous body as in claim 12 wherein the base metallic composition is a metal element and the solid additive forms a dispersion alloy product therewith.

14. A porous body as in claim 13 wherein the solid additive is an oxide of a different metal.

15. A porous body as in claim 13 wherein the base metallic composition is a refractory metal element and the solid additive is a different metal which forms a dispersion alloy therewith.

16. The sintered product of a porous body as recited in claim 12.

17. A sintered product as in claim 16 wherein the base metallic composition is a metal element and the solid additive forms a dispersion alloy product therewith.

18. A sintered dispersion alloy product having a substantially continuous crystalline phase of a base metallic composition having dispersed there in a solid additive dispersed in a concentration gradient with the maximum concentration being located at every exterior surface portion of said dispersion alloy product and with said concentration continuously and uniformly diminishing with increasing distance to the interior portion of the dispersion alloy product so that no sharp compositional variation of the additive results along said concentration gradient.

19. A sintered dispersion alloy product as in claim 18 wherein the base metallic composition is a metal element and the solid additive is a different metal element.

20. A sintered dispersion alloy product as in claim 18 wherein the base metallic composition is a refractory metal and the solid additive is an oxide of a different metal.

21. A sintered dispersion alloy product as in claim 18 having a central core of unalloyed composition.

22. A sintered dispersion alloy product as in claim 18 wherein the additive is an oxide mixture.

23. A sintered dispersion alloy product as in claim 18 which further includes a second solid additive dispersed at a different concentration gradient in the base metallic composition than the concentration gradient established by the first solid additive.

References Cited

UNITED STATES PATENTS

| | | | |
|---|---|---|---|
| 3,031,342 | 4/1962 | Kertesz et al. | 117—113 |
| 3,042,551 | 7/1962 | Perry | 117—113 X |
| 3,505,102 | 4/1970 | Nearn et al. | 117—113 |
| 3,653,883 | 4/1972 | Month et al. | 75—222 |
| 3,661,571 | 5/1972 | Hintermann et al. | 29—182.5 X |

FOREIGN PATENTS 1,093,446   12/1962   Great Britain.

CARL D. QUARFORTH, Primary Examiner

R. E. SCHAFER, Assistant Examiner

U.S. Cl. X.R.

29—182, 192; 75—200, 206, 211; 117—113